United States Patent
Jeol et al.

(10) Patent No.: US 12,473,402 B2
(45) Date of Patent: Nov. 18, 2025

(54) POLYAMIDES AND CORRESPONDING POLYMER COMPOSITIONS, ARTICLES AND METHODS FOR MAKING AND USING

(71) Applicant: SYENSQO SPECIALTY POLYMERS USA, LLC, Alpharetta, GA (US)

(72) Inventors: Stéphane Jeol, Saint-Genis-Laval (FR); Joel Flores, Alpharetta, GA (US)

(73) Assignee: SYENSQO SPECIALTY POLYMERS USA, LLC, Alpharetta, GA (US)

( * ) Notice: Subject to any disclaimer, the term of this patent is extended or adjusted under 35 U.S.C. 154(b) by 724 days.

(21) Appl. No.: 17/635,784

(22) PCT Filed: Aug. 25, 2020

(86) PCT No.: PCT/EP2020/073751
§ 371 (c)(1),
(2) Date: Feb. 16, 2022

(87) PCT Pub. No.: WO2021/037850
PCT Pub. Date: Mar. 4, 2021

(65) Prior Publication Data
US 2022/0289909 A1    Sep. 15, 2022

Related U.S. Application Data

(60) Provisional application No. 62/892,042, filed on Aug. 27, 2019.

(51) Int. Cl.
  C08G 69/36    (2006.01)
  C08J 5/04     (2006.01)
  C08K 7/14     (2006.01)
(52) U.S. Cl.
  CPC .............. C08G 69/36 (2013.01); C08J 5/043 (2013.01); C08K 7/14 (2013.01); C08J 2333/24 (2013.01)
(58) Field of Classification Search
  CPC ....... C08G 69/36; C08J 5/043; C08J 2333/24; C08K 7/14
  See application file for complete search history.

(56) References Cited

U.S. PATENT DOCUMENTS

| | | | |
|---|---|---|---|
| 4,760,129 A | 7/1988 | Haering et al. | |
| 5,191,060 A | 3/1993 | Akkapeddi et al. | |
| 5,270,445 A | 12/1993 | Hou | |
| 5,298,598 A | 3/1994 | Yuo et al. | |
| 5,691,432 A | 11/1997 | Williams | |
| 5,708,125 A | 1/1998 | Liedloff et al. | |
| 8,173,258 B2 | 5/2012 | Monsheimer et al. | |
| 8,324,297 B2 | 12/2012 | Hewel et al. | |
| 9,365,744 B2 | 6/2016 | Briffaud et al. | |
| 2002/0055589 A1 | 5/2002 | Matsuoka et al. | |
| 2003/0050376 A1 | 3/2003 | Oka et al. | |
| 2004/0077769 A1 | 4/2004 | Martens et al. | |
| 2006/0052508 A1 | 3/2006 | Cevolini | |
| 2006/0293435 A1 | 12/2006 | Marens et al. | |
| 2008/0274355 A1 | 11/2008 | Hewel | |
| 2009/0098325 A1 | 4/2009 | Uchida et al. | |
| 2011/0195215 A1 | 8/2011 | Briffaud et al. | |
| 2014/0031481 A1* | 1/2014 | Singletary | C08K 3/013 524/456 |
| 2014/0209969 A1* | 7/2014 | Bushelman | H10H 20/854 438/26 |
| 2015/0376335 A1 | 12/2015 | Brule et al. | |
| 2015/0377389 A1 | 12/2015 | Blondel et al. | |
| 2016/0251479 A1* | 9/2016 | Smith | C08G 69/28 524/607 |
| 2017/0107326 A1 | 4/2017 | Bayer et al. | |
| 2019/0232628 A1 | 8/2019 | Capelot et al. | |

FOREIGN PATENT DOCUMENTS

| | | |
|---|---|---|
| EP | 0410650 A1 | 1/1991 |
| EP | 1505099 A2 | 2/2005 |
| EP | 3156435 A1 | 4/2017 |
| JP | 2002293927 A | 10/2002 |
| JP | H07331063 A | 5/2003 |
| WO | 2014125218 A1 | 8/2014 |
| WO | 2014125219 A1 | 8/2014 |
| WO | 2015096196 A1 | 7/2015 |
| WO | 201811493 A1 | 1/2018 |

OTHER PUBLICATIONS

Murphy J., in "Additives for Plastics Handbook", 2nd Edition, 2001, Chapter 5.2.3., p. 43-48—Elsevier Advanced Technology.
Gallini J., "Polyamides, Aromatic", Kirk-Othmer Encyclopedia of Chemical technology, 2003, vol. 18, p. 1-31, John Wiley & Sons.
Vins, I., "Practical Aspects of Evaluation of Chromatographic Data in Size Exclusion Chromatography", Biocompare Articles, 2006.

* cited by examiner

Primary Examiner — Shane Fang
(74) Attorney, Agent, or Firm — Osha Bergman Watanabe & Burton LLP

(57) ABSTRACT

Described herein are polyamides (PA) incorporating a cycloaliphatic monomer containing a cyclohexyl group. It was surprisingly discovered that by incorporating the cycloaliphatic monomer containing a cyclohexyl group, the resulting polyamides (PA) had significantly reduced water absorption and significantly increased Tg, while maintaining high Tm, Tc and good mechanical properties, relative to analogous polyamides free of the cycloaliphatic monomer and PA6,T based polyamides copolymerized with either or both of isophthalic acid and adipic acid.

22 Claims, No Drawings

POLYAMIDES AND CORRESPONDING POLYMER COMPOSITIONS, ARTICLES AND METHODS FOR MAKING AND USING

CROSS REFERENCE TO RELATED APPLICATIONS

This application is a U.S. National Stage entry under 35 U.S.C. § 371 of International Application No. PCT/EP2020/073751, filed on Aug. 25, 2020, which claims priority to U.S. provisional patent application No. 62/892,042, filed on Aug. 27, 2019, the entirety of which being incorporated herein by reference for all purposes.

FIELD

Polyamides having improved water absorption properties and good mechanical properties are provided, as are polymer compositions including the polyamides and articles comprising such polymers and polymer compositions.

BACKGROUND

Polyamides such as PA6,T are generally polymerized with comonomers such as isophthalic acid or adipic acid. Such polyamides have the outstanding mechanical performance and chemical resistance of PA6,T, but can be processed at lower temperatures due to the presence of the comonomers. However, the incorporation of isophthalic acid or adipic acid into PA6 results in a polyamide that has increased moisture absorption, which reduces the dimensional stability of the articles formed from such polymers. Accordingly, there is a need for polyamides having the excellent mechanical performance and chemical resistance of PA6,T-based copolyamides, while having reduced moisture absorption.

SUMMARY

In one aspect, a polyamide (PA) is provided. The polyamide (PA) is formed from the polycondensation of a reaction mixture (RM) comprising: a diamine component (A) comprising: 55 mol % to 75 mol % of a $C_4$ to $C_8$ aliphatic diamine, 25 mol % to 45 mol % of a $C_9$ to $C_{12}$ aliphatic diamine, and 0 mol % to 10 mol % of a cycloaliphatic diamine containing a cyclohexyl group, wherein mol % is relative to the total number of moles of diamines in the diamine component (A); a dicarboxylic acid component (B) comprising: 90 mol % to 100 mol % of terephthalic acid, 0 mol % to 10 mol % of a $C_6$ to $C_{18}$ aliphatic dicarboxylic acid or a $C_8$ to $C_{18}$ aromatic dicarboxylic acid distinct from terephthalic acid, and 0 mol % to 10 mol % of a cycloaliphatic dicarboxylic acid containing a cyclohexyl group, wherein mol % is relative to the total number of moles of dicarboxylic acids in the dicarboxylic acid component (B); and an amino acid component (C) comprising 0 mol % to 9 mol % of a $C_8$ to $C_{10}$ cycloaliphatic amino acid containing a cyclohexyl group, wherein mol % is relative to the total number of moles of dicarboxylic acids in the dicarboxylic acid component (B); and wherein one of the cycloaliphatic diamine, the cycloaliphatic dicarboxylic acid, and the cycloaliphatic amino acid has a concentration of greater than 0.5 mol % in the reaction mixture. In some embodiments, only one of the cycloaliphatic diamine, the cycloaliphatic dicarboxylic acid, and the cycloaliphatic amino acid has a concentration of greater than 0.5 mol % and the reaction mixture (RM) is free of the other two cycloaliphatic monomers containing a cyclohexyl group. Additionally or alternatively, in some embodiments, the reaction mixture (RM) is free of the $C_6$ to $C_{18}$ aliphatic dicarboxylic acid and/or $C_8$ to $C_{18}$ aromatic dicarboxylic acid distinct from terephthalic acid.

In another aspect, a polymer composition (PC) is provided. The polymer composition (PC) comprises the polyamide (PA) and at least one component selected from the group consisting of reinforcing agents, tougheners, plasticizers, colorants, pigments, antistatic agents, dyes, lubricants, thermal stabilizers, light stabilizers, flame retardants (such as halogen free flame retardants), nucleating agents and antioxidants. Preferably, the polymer composition (PC) includes at least a halogen free flame retardant. In some embodiments, the polymer composition (PC) includes 10 wt. % to 60 wt. % of glass fibers, based on the total weight of the polymer composition (PC). In some embodiments, the polymer composition (PC) includes from 30 wt. % to 99.95 wt. % of the polyamide (PA).

DETAILED DESCRIPTION

Described herein are polyamides (PA) incorporating a cycloaliphatic monomer containing a cyclohexyl group. It was surprisingly discovered that by incorporating the cycloaliphatic monomer containing a cyclohexyl group, the resulting polyamides (PA) had significantly reduced water absorption, while maintaining good mechanical properties, relative to both analogous polyamides free of the cycloaliphatic monomer as well as PA6,T-based polyamides copolymerized with either or both of isophthalic acid and adipic acid. Furthermore, it was surprisingly discovered that at relatively low concentrations of the cycloaliphatic monomer containing a cyclohexyl group, the polyamides (PA) had significantly increased glass transition temperatures ("Tg"), while maintaining high melting temperatures ("Tm") and crystallization temperatures ("Tc"), relative to analogous polyamides free of the cycloaliphatic monomer containing a cyclohexyl group.

The polyamides (PA) are formed from the polycondensation of a reaction mixture (RM), as described in detail below, including a cycloaliphatic monomer containing a cyclohexyl group, which is selected from the group consisting of a cycloaliphatic diamine containing a cyclohexyl group, a cycloaliphatic dicarboxylic acid containing a cyclohexyl group, and a $C_8$ to $C_{10}$ cycloaliphatic amino acid containing a cyclohexyl group. Of course in some embodiments, the reaction mixture (RM) can include two or more distinct cycloaliphatic monomers containing a cyclohexyl group, wherein each cycloaliphatic monomer is independently selected from a cycloaliphatic diamine containing a cyclohexyl group, a cycloaliphatic dicarboxylic acid containing a cyclohexyl group, and a $C_8$ to $C_{10}$ cycloaliphatic amino acid containing a cyclohexyl group.

Unless specifically limited otherwise, the term "alkyl", as well as derivative terms such as "alkoxy", "acyl" and "alkylthio", as used herein, include within their scope linear chain, branched chain and cyclic moieties. Examples of alkyl groups are methyl, ethyl, 1-methylethyl, propyl, 1,1-dimethylethyl, and cyclopropyl. Unless specifically stated otherwise, each alkyl and aryl group may be unsubstituted or substituted with one or more substituents selected from but not limited to halogen, hydroxy, sulfo, $C_1$-$C_6$ alkoxy, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied. The term "halogen" or "halo" includes fluorine, chlorine, bromine and iodine, with fluorine being preferred.

The term "aryl" refers to a phenyl, indanyl or naphthyl group. The aryl group may comprise one or more alkyl groups, and in this case may be referred to as an "alkylaryl" group; for example may be composed of an aromatic group and two $C_1$-$C_6$ groups (e.g. methyl or ethyl). The aryl group may also comprise one or more heteroatoms, e.g. N, O or S, and in this case may be referred to as a "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, $C_1$-$C_6$ alkoxy, sulfo, $C_1$-$C_6$ alkylthio, $C_1$-$C_6$ acyl, formyl, cyano, $C_6$-$C_{15}$ aryloxy or $C6$-$C_{15}$ aryl, provided that the substituents are sterically compatible and the rules of chemical bonding and strain energy are satisfied.

The Reaction Mixture

The polyamide (PA) is formed from the polycondensation of a reaction mixture (RM) including a diamine component (A), a dicarboxylic acid component (B), and an amino acid component (C). The diamine component (A) comprises 55 mol % to 75 mol % of a $C_4$ to $C_8$ aliphatic diamine; 25 mol % to 45 mol % of a $C_9$ to $C_{12}$ aliphatic diamine; and 0 mol % to 10 mol % of a cycloaliphatic diamine containing a cyclohexyl group, wherein mol % is relative to the total number of moles of diamines in the diamine component (A). The dicarboxylic acid component (B) comprises 90 mol % to 100 mol % of terephthalic acid; 0 mol % to 10 mol % of a $C_6$ to $C_{18}$ aliphatic dicarboxylic acid or a $C_8$ to $C_{18}$ aromatic dicarboxylic acid distinct from terephthalic acid; and 0 mol % to 10 mol % of a cycloaliphatic dicarboxylic acid containing a cyclohexyl group, wherein mol % is relative to the total number of moles of dicarboxylic acids in the dicarboxylic acid component (B). The amino acid component (C) comprises 0 mol % to 9 mol % of a $C_8$ to C10 cycloaliphatic amino acid containing a cyclohexyl group, wherein mol % is relative to the total number of moles of dicarboxylic acid component (B). For clarity, the $C_4$ to $C_8$ aliphatic diamine and the $C_9$ to $C_{12}$ aliphatic diamine can be linear or branched aliphatic diamines. Preferably, the $C_4$ to $C_8$ aliphatic diamine and the $C_9$ to $C_{12}$ aliphatic diamines are both linear aliphatic diamines. Similarly, the $C_6$ to $C_{18}$ aliphatic dicarboxylic acid can be a linear or branched aliphatic dicarboxylic acid. In the reaction mixture (RM), the concentration of each of the diamines, dicarboxylic acids and optional amino acids is preferably selected such that [—NH$_2$]/[—COOH] is from 0.9 to 1.1, preferably from 0.95 to 1.05, where [—NH$_2$] and [—COOH] are the number of moles of —NH$_2$ and —COOH groups, respectively, in the reaction mixture (RM).

For ease of reference, as used hereafter, the concentration of a diamine refers to its concentration relative to the total number of moles of diamines in the diamine component (A), unless explicitly noted otherwise. Similarly, as used herein, the concentration of a dicarboxylic acid refers to its concentration relative to the total number of moles of the dicarboxylic acids in the dicarboxylic acid component (B). Additionally, as used herein, the concentration of an amino acid refers to its concentration relative to the total number of moles of dicarboxylic acids in the dicarboxylic acid component (B). As used herein, "free of" with respect to a monomer in the reaction mixture (RM) means the indicated monomer has a concentration of less than 0.5 mol %, preferably less than 0.1 mol % in the reaction mixture. For example, if the reaction mixture (RM) is free of the cycloaliphatic diamine containing a cyclohexyl group, its' concentration in the reaction mixture (RM) is less than 0.5 mol %, preferably less than 0.1 mol %.

Significantly, as noted above, one of the cycloaliphatic diamine containing a cyclohexyl group, the cycloaliphatic dicarboxylic acid containing a cyclohexyl group, and the $C_8$ to $C_{10}$ cycloaliphatic amino acid containing a cyclohexyl group has a concentration of greater than 0.5 mol % in the reaction mixture (RM). Of course, in some embodiments, any two or all of the cycloaliphatic monomers containing a cyclohexyl group can have a concentration greater than 0.5 mol % in the reaction mixture (RM). In some embodiments, only one of the three cycloaliphatic monomers containing a cyclohexyl group has a concentration of greater 0.5 mol % in the reaction mixture (RM), and the reaction mixture (RM) is free of the other two cycloaliphatic monomers containing a cyclohexyl group.

The diamine component (A) includes all diamines in the reaction mixture (RM). Similarly, the dicarboxylic acid component (B) includes all dicarboxylic acids in the reaction mixture (RM) and the amino acid component (C) includes all of the amino acids in the reaction mixture (RM).

In some embodiments, the diamine component (A) includes from 0.5 mol % to 10 mol %, preferably 1 mol % to 10 mol % of a cycloaliphatic diamine containing a cyclohexyl group. In one such embodiment, the reaction mixture (RM) is free of the $C_6$ to $C_{18}$ aliphatic dicarboxylic acid, the $C_8$ to $C_{18}$ aromatic dicarboxylic acid distinct from terephthalic acid, the cycloaliphatic dicarboxylic acid containing a cyclohexyl group and/or the $C_8$ to $C_{10}$ cycloaliphatic amino acid containing a cyclohexyl group. In some such embodiments, the reaction mixture (RM) is free of additional diamines, additional dicarboxylic acids and additional amino acids. For clarity, additional monomers refer to monomers not explicitly recited in the reaction mixture (RM) as defined above.

In some embodiments, the dicarboxylic acid component (B) includes from 0.5 mol % to 10 mol %, preferably 1 mol % to 10 mol % of a cycloaliphatic dicarboxylic acid containing a cyclohexyl group. In one such embodiment, the reaction mixture (RM) is free of the cycloaliphatic diamine containing a cyclohexyl group, the $C_6$ to $C_{18}$ aliphatic dicarboxylic acid, the $C_8$ to $C_{18}$ aromatic dicarboxylic acid distinct from terephthalic acid, and/or the $C_8$ to $C_{10}$ cycloaliphatic amino acid containing a cyclohexyl group. In some such embodiments, the reaction mixture (RM) is free of additional diamines, additional dicarboxylic acids and additional amino acids, other than those explicitly recited in connection with the reaction mixture (RM) as defined above.

In some embodiments, the amino acid component (C) includes from 0.5 mol % to 10 mol %, preferably 1 mol % to 10 mol % of a $C_8$ to $C_{10}$ cycloaliphatic amino acid containing a cyclohexyl group. In one such embodiment, the reaction mixture (RM) is free of the cycloaliphatic diamine containing a cyclohexyl group, the $C_6$ to $C_{18}$ aliphatic dicarboxylic acid, the $C_8$ to $C_{18}$ aromatic dicarboxylic acid distinct from terephthalic acid, and/or the cycloaliphatic dicarboxylic acid containing a cyclohexyl group. In some such embodiments, the reaction mixture (RM) is free of additional diamines, additional dicarboxylic acids and additional amino acids, other than those explicitly recited in connection with the reaction mixture (RM) as defined above.

The Diamine Component (A)

The diamine component (A) includes 55 mol % to 75 mol % of a $C_4$ to $C_8$ aliphatic diamine, 25 mol % to 45 mol % of a $C_9$ to $C_{12}$ aliphatic diamine and 0 mol % to 10 mol % of a cycloaliphatic diamine containing a cyclohexyl group.

In some embodiments, the $C_4$ to $C_8$ aliphatic diamine and the $C_9$ to $C_{12}$ diamine are represented by the following formulae (1) and (2), respectively:

$$H_2N-R_1-NH_2, \quad (1) \text{ and}$$

$$H_2N-R_2-NH_2, \quad (2)$$

where $R_1$ is a $C_4$ to $C_8$ aliphatic alkyl, preferably a $C_6$ aliphatic alkyl group, and $R_2$ is a $C_9$ to $C_{12}$ aliphatic alkyl group, preferably a $C_{10}$ aliphatic alkyl group. In some embodiments, the $C_4$ to $C_8$ aliphatic diamine is selected from the group consisting of 1,4-diaminobutane ("putrescine"), 1,5-diaminopentane ("cadaverine"), 2-methyl-1,5-diaminopentane, hexamethylenediamine ("HMDA"), 3-methylhexamethylenediamine, 2,5-dimethylhexamethylenediamine, 1,7-diaminoheptane and 1,8-diaminooctane. In some embodiments, the $C_9$ to $C_{12}$ aliphatic diamine is selected from the group consisting of 2,2,4-trimethyl-hexamethylenediamine, 2,4,4-trimethyl-hexamethylenediamine, 2-ethyl-1,7-diaminoheptane, 2-methyl-1,8-diaminooctane, 2,2,7,7-tetramethyloctamethylenediamine, 1,9-diaminononane, 2-methyl-1,8-diaminooctane, 5-methyl-1,9-diaminononane, 1,10-diaminodecane, 1,11-diaminoundecane, and 1,12-diaminododecane. Preferably, the $C_4$ to $C_8$ aliphatic diamine is HMDA and/or the $C_9$ to $C_{12}$ aliphatic diamine is 1,10-diaminodecane. Most preferably, the $C_4$ to $C_8$ aliphatic diamine is HMDA and the $C_9$ to $C_{12}$ aliphatic diamine is 1,10-diaminodecane.

In some embodiments, the cycloaliphatic diamine containing a cyclohexyl group is represented by one of the following formulae (3) and (4):

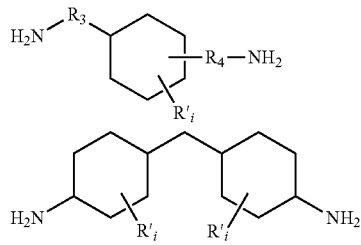

where $R_3$ and $R_4$, are independently selected from the group consisting of a bond and a $C_1$ to $C_{10}$ alkyl group; R', at each location, is independently selected from the group consisting of an alkyl, an aryl, an alkali or alkaline earth metal sulfonate, an alkyl sulfonate, and a quaternary ammonium; and each i is an independently selected integer from 0 to 10. In Formula (3), preferably, the $-R_3-NH_2$ and $-R_4-NH_2$ groups are relatively positioned in the meta position (1,3-) or the para position (1,4-), most preferably in the meta position. In some embodiments, the cycloaliphatic diamine containing a cyclohexyl group is selected from the group consisting of isophorone diamine, 1,3-diaminocyclohexane, 1,4-diaminocyclohexane, bis-p-aminocyclohexylmethane, 1,3-bis (aminomethyl)cyclohexane ("1,3-BAC"), 1,4 bis(aminomethyl)cyclohexane ("1,4-BAC"), bis(4-amino-3-methylcyclohexyl)methane and bis(4-aminocyclohexyl) methane. Preferably, the cycloaliphatic diamine containing a cyclohexyl group is 1,3-BAC or 1,4-BAC, most preferably, 1,3-BAC. Of course, the cycloaliphatic diamines containing a cyclohexyl group according to Formula (3) (e.g. 1,3-BAC and 1,4-BAC) can be in a cis or trans conformation. Accordingly, the diamine component (A) can include only the cis isomers, only the trans isomers or a mixture of the cis and the trans isomers.

In some embodiments, the concentration of the $C_4$ to $C_8$ aliphatic diamine is from 60 mol % to 70 mol %. In some embodiments, the concentration of the $C_9$ to $C_{12}$ aliphatic diamine is from 30 mol % to 45 mol %, preferably from 25 mol % to 38 mol %, most preferably from 30 mol % to 38 mol %. In some embodiments, the concentration of the cycloaliphatic diamine containing a cyclohexyl group is from 1 mol % to 10 mol %, preferably from 3 mol % to 10 mol %. In some embodiments, the reaction mixture (RM) is free of the cycloaliphatic diamine containing a cyclohexyl group.

In some embodiments, the total concentration of the $C_4$ to $C_8$ aliphatic diamine, the $C_9$ to $C_{12}$ aliphatic diamine and the cycloaliphatic diamine containing a cyclohexyl group is at least 90 mol %, at least 95 mol %, at least 98 mol %, at least 99 mol %, at least 99.5 mol % or at least 99.9 mol %. In some embodiments, the diamine component (A) can include additional diamines, each distinct from each other and from the $C_4$ to $C_8$ aliphatic diamine, the $C_9$ to $C_{12}$ aliphatic diamine and the cycloaliphatic diamine containing a cyclohexyl group. In some such embodiments including additional diamines, the total concentration of $C_4$ to $C_8$ aliphatic diamines, $C_9$ to $C_{12}$ aliphatic diamines, cycloaliphatic diamines containing a cyclohexyl group are all within the corresponding ranges given above. In other such embodiments including additional diamines, the concentration of each additional diamine is distinct from the ranges given above with respect to the $C_4$ to $C_8$ aliphatic diamines, the $C_9$ to $C_{12}$ aliphatic diamines; and cycloaliphatic diamines containing a cyclohexyl group.

The Dicarboxylic Acid Component (B)

The dicarboxylic acid component (B) includes 90 mol % to 100 mol % of terephthalic acid; 0 mol % to 10 mol % of a $C_6$ to $C_{18}$ aliphatic dicarboxylic acid or a $C_8$ to $C_{18}$ aromatic dicarboxylic acid distinct from terephthalic acid; and 0 mol % to 10 mol % of a cycloaliphatic dicarboxylic acid containing a cyclohexyl group.

In some embodiments, the $C_6$ to $C_{18}$ aliphatic dicarboxylic acid is selected from the group consisting of 2,2-dimethyl-glutaric acid [HOOC—C(CH$_3$)$_2$—(CH$_2$)$_2$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH], tridecanedioic acid [HOOC—(CH$_2$)$_{11}$—COOH], tetradecanedioic acid [HOOC—(CH$_2$)$_{12}$—COOH], pentadecanedioic acid [HOOC—(CH$_2$)$_{13}$—COOH], hexadecanedioic acid [HOOC—(CH$_2$)$_{14}$—COOH], and octadecanedioic acid [HOOC—(CH$_2$)$_{16}$—COOH]. Preferably, the $C_6$ to $C_{18}$ aliphatic dicarboxylic acid is adipic acid or sebacic acid, most preferably adipic acid.

In some embodiments, the $C_8$ to $C_{18}$ aromatic dicarboxylic acid distinct from terephthalic acid is selected from the group consisting of phthalic acids, including isophthalic acid ("IA") and excluding terephthalic acid ("TA"), naphthalenedicarboxylic acids (e.g. naphthalene-2,6-dicarboxylic acid), 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl)propane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, 2,2-bis(3-carboxyphenyl)hexafluoropropane, 2,2-bis(3-carboxyphenyl)ketone, bis(3-carboxyphenoxy)benzene. Preferably, the $C_8$ to $C_{18}$ aromatic dicarboxylic acid is naphthalenedicarboxylic acid or 4,4'-bibenzoic acid.

In some embodiments, the cycloaliphatic dicarboxylic acid containing a cyclohexyl group is represented by the following formula:

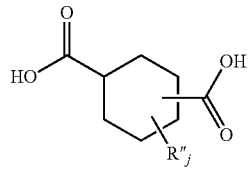

wherein R", at each location, is independently selected from the group consisting of an alkyl, an aryl, an alkali or alkaline earth metal sulfonate, an alkyl sulfonate, and a quaternary ammonium; and j is an integer from 0 to 10. In Formula (5), preferably, the —C—COOH groups are relatively positioned in the meta position (1,3-) or the para position (1,4-), most preferably in the para position. In some embodiments, the cycloaliphatic carboxylic acid containing a cyclohexyl group is a cyclohexane dicarboxylic acid ("CHDA"), preferably 1,3-CHDA or 1,4-CHDA, most preferably 1,4-CHDA.

In some embodiments, the concentration of the terephthalic acid is from 92 mol % to 100 mol %, preferably 93 mol % to 100 mol %. In some embodiments, the concentration of the $C_6$ to $C_{18}$ aliphatic dicarboxylic acid or the $C_8$ to $C_{18}$ aromatic dicarboxylic acid distinct from terephthalic acid is 0 mol % to 0.5 mol %, preferably from 0 mol % to 0.1 mol %. In some embodiments, the concentration of the cycloaliphatic dicarboxylic acid containing a cyclohexyl group is from 3 mol % to 9 mol %. In some embodiments, the dicarboxylic acid component (B) is free one, two or all three of the $C_6$ to $C_{18}$ aliphatic dicarboxylic acid, the $C_8$ to $C_{18}$ aromatic dicarboxylic acid distinct from terephthalic acid, and the cycloaliphatic dicarboxylic acid containing a cyclohexyl group.

In some embodiments, the total concentration of the terephthalic acid, the $C_6$ to $C_{18}$ aliphatic dicarboxylic acid, the $C_8$ to $C_{18}$ aromatic dicarboxylic acid distinct from terephthalic acid, and the cycloaliphatic dicarboxylic acid containing a cyclohexyl group is at least 90 mol %, at least 95 mol %, at least 98 mol %, at least 99 mol %, at least 99.5 mol % or at least 99.9 mol %. In some embodiments, the dicarboxylic acid component (B) can include additional dicarboxylic acids, each distinct from each other and from the terephthalic acid, the $C_6$ to $C_{18}$ aliphatic dicarboxylic acid, the $C_8$ to $C_{18}$ aromatic dicarboxylic acid distinct from terephthalic acid, and the cycloaliphatic dicarboxylic acid containing a cyclohexyl group. In some such embodiments including additional dicarboxylic acids, the total concentration of the $C_6$ to $C_{18}$ aliphatic dicarboxylic acids, the $C_8$ to $C_{18}$ aromatic dicarboxylic acids distinct from terephthalic acid and the cycloaliphatic dicarboxylic acids containing a cyclohexyl group are within the corresponding ranges given above. In other such embodiments including additional dicarboxylic acids, the concentration of each additional dicarboxylic acid is distinct from the ranges given above with respect to the $C_6$ to $C_{18}$ aliphatic dicarboxylic acid, the $C_8$ to $C_{18}$ aromatic dicarboxylic acid distinct from terephthalic acid and the cycloaliphatic dicarboxylic acid containing a cyclohexyl group.

The Amino Acid Component (C)

The amino acid component (C) includes 0 mol % to 9 mol % of a $C_8$ to $C_{10}$ cycloaliphatic amino acid containing a cyclohexyl group, wherein mol % is relative to the total number of moles of dicarboxylic acids in the dicarboxylic acid component (B).

In some embodiments, the $C_8$ to $C_{10}$ cycloaliphatic amino acid containing a cyclohexyl group is represented by the following formula:

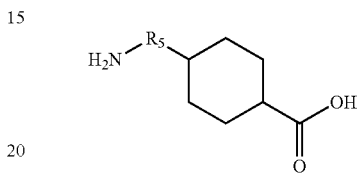

wherein $R_5$ is a $C_1$ to C3 alkyl group, preferably a $C_1$ alkyl group. Preferably, the $C_8$ to $C_{10}$ cycloaliphatic amino acid containing a cyclohexyl group is 4- aminomethylcyclohexanecarboxylic acid ("4-AMCC"). Of course, the cycloaliphatic amino acid according to formula (6) can be in a cis or trans conformation. Accordingly, the amino acid component (C) can include only the cis isomers, only the trans isomers or a mixture of the cis and the trans isomers.

In some embodiments, the concentration of the $C_8$ to $C_{10}$ cycloaliphatic amino acid containing a cyclohexyl group is from 1 mol % to 9 mol %, preferably from 3 mol % to 9 mol %, wherein mol % is relative to the total number of moles of dicarboxylic acids in the dicarboxylic acid component (B). In some embodiments, the reaction mixture (RM) is free of the $C_8$ to $C_{10}$ cycloaliphatic amino acid containing a cyclohexyl group. In some such embodiments, the amino acid component (C) may or may not contain additional amino acids distinct from the $C_8$ to $C_{10}$ cycloaliphatic amino acid containing a cyclohexyl group. In some embodiments, the reaction mixture (RM) is free of amino acids.

In some embodiments, the total concentration of the $C_8$ to $C_{10}$ cycloaliphatic amino acid containing a cyclohexyl group is at least 90 mol %, at least 95 mol %, at least 98 mol %, at least 99 mol %, at least 99.5 mol % or at least 99.9 mol % relative to the total amount of amino acids in the amino acid component (C). In some embodiments, the amino acid component (C) can include additional amino acids, each distinct from each other and from the $C_8$ to $C_{10}$ cycloaliphatic amino acid. In some such embodiments including additional amino acids, the total concentration of $C_8$ to $C_{10}$ cycloaliphatic amino acids containing a cyclohexyl group and any additional amino acid(s) is within the corresponding ranges given above. In other such embodiments including additional amino acids, the concentration of each additional amino acid is distinct from the range given above with respect to the $C_8$ to $C_{10}$ cycloaliphatic amino acid containing a cyclohexyl group.

Polyamide (PA) Synthesis

The polyamide (PA) described herein can be prepared by any conventional method adapted to the synthesis of polyamides and polyphthalamides. Preferably, the polyamide (PA) is prepared by reacting (by heating) the reaction mixture (RM) in the presence of less than 60 wt. % of water, preferentially less than 50 wt. % water, up to a temperature of at least Tm+10° C., Tm being the melting temperature of the polyamide (PA), where wt. % is relative to the total weight of the reaction mixture (RM).

The polyamide (PA) described herein can for example be prepared by thermal polycondensation (also referred to as polycondensation or condensation) of aqueous solution of monomers and comonomers. In one embodiment, the polyamide (PA) is formed by reacting, in the reaction mixture (RM), the diamines, the dicarboxylic acids and the amino acids. In some embodiments, the total number of moles of diamines in the diamine component (A) is substantially equimolar to the total number of moles of dicarboxylic acids in the dicarboxylic acid component (B). As used herein, substantial equimolar denotes a value that is ±15% of the indicated number of moles. For example, in the context of the diamine and dicarboxylic acid concentrations in the respective diamine component (A) and dicarboxylic acid component (B) of the reaction mixture (RM), total number of moles of diamines in the diamine component (A) is ±15% of the total number of moles of dicarboxylic acids in the dicarboxylic acid component (B). Significantly, as mentioned above, in the reaction mixture (RM) the concentration of each diamine, dicarboxylic acid and optional amino acid is selected such that [—NH$_2$]/[—COOH] is from 0.9 to 1.1, preferably from 0.95 to 1.05, where [—NH$_2$] and [—COOH] are the total number of moles of —NH$_2$ and —COOH groups, respectively, in the reaction mixture (RM). The polyamides (PA) may contain a chain limiter, which is a monofunctional molecule capable of reacting with the amine or carboxylic acid moiety to control the molecular weight of the polyamide (PA). For example, the chain limiter can be acetic acid, propionic acid, benzoic acid and/or benzylamine.

A catalyst can also be used. Examples of catalysts are phosphorous acid, ortho-phosphoric acid, meta-phosphoric acid, alkali-metal hypophosphite such as sodium hypophosphite and phenylphosphinic acid. A stabilizer, such as a phosphite, may also be used.

The Polyamide (PA)

The polyamides (PA) include 3 recurring units ($R_{PA1}$) to ($R_{PA3}$), formed from the polycondensation of the diamines in the diamine component (A), the dicarboxylic acids in the dicarboxylic acid component (B) and the amino acids, if present, in the amino acid component (C). Of course, the polyamide (PA) can have additional recurring units, distinct from recurring units ($R_{PA1}$) to ($R_{PA3}$).

In some embodiments, recurring units ($R_{PA1}$) and ($R_{PA2}$) are represented by the following formulae (7) and (8), respectively:

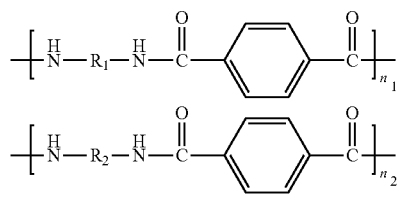

and recurring unit ($R_{PA3}$) is represented by either one of the following formulae (9) or (10):

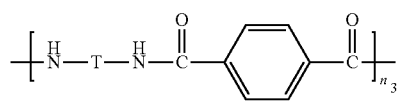

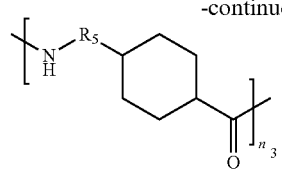

where $R_1$, R2 and $R_5$ are defined above; $n_1$ to $n_3$ are mol % of recurring units ($R_{PA1}$) to ($R_{PA3}$), respectively; and T is represented by either one of the following formulae (11) or (12):

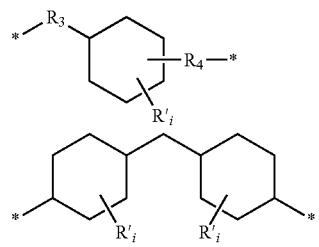

where $R_3$, $R_4$, R' and i are defined above; and the '*' denotes a bond to one of the two explicit nitrogen atoms in Formula (9). Preferably, T is represented by Formula (11), preferably where the —R4-group is in meta (1,3-) position relative to the —R3-group. Additionally or alternatively, in some embodiments, each i is zero. In one embodiment, recurring units ($R_{PA1}$) and ($R_{PA2}$) are formed from the polycondensation of HMDA and 1,10-diaminodecane, respectively, with terephthalic acid. In one embodiment, recurring unit ($R_{PA3}$) is formed form the polycondensation of either 1,3-BAC or 1,4-BAC, preferably 1,3-BAC, with terephthalic acid. In another embodiment, recurring unit ($R_{PA3}$) is formed from the polycondensation of 4-AMCC. In some embodiments, $n_1+n_2+n_3$ is at least 80 mol %, at least 90 mol %, at least 95 mol %, or at least 99 mol %. As used herein, concentration of recurring units refers to the concentration relative to the total number of recurring units in the polyamide (PA), unless explicitly stated otherwise. For example, with respect to recurring units ($R_{PA1}$) to ($R_{PA3}$) described above, $n_1+n_2+n_3$≤100 mol %.

In some embodiments, the polyamide (PA) includes 4 recurring units: recurring units ($R_{PA1}$) and ($R_{PA2}$), as given above, and recurring units ($R_{PA4}$) and ($R_{PA5}$) represented by the following formulae (13) and (14), respectively:

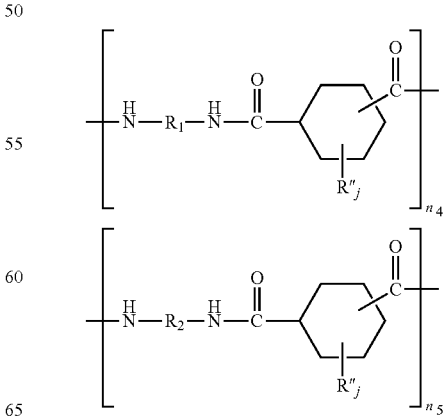

where $R_1$, $R_2$, R", and j are defined above and where $n_1$, $n_2$, $n_4$ and $n_5$ are mol % of recurring units $(R_{P41})$, $(R_{P42})$, (RPA4) and $(R_{P45})$, respectively ($n_1+n_2+n_4+n_5 \leq 100$ mol %). Preferably, in each of Formulae (13) and (14), the explicit —COO— groups on the cyclohexyl ring are relatively positioned in the para (1,4-) position. Additionally or alternatively, in some embodiments, j is zero. In one embodiment, recurring units $(R_{P41})$ and $(R_{P42})$ are formed from the polycondensation of HMDA and 1,10-diaminodecane with terephthalic acid, respectively, and recurring units $(R_{P44})$ and $(R_{P45})$ are formed form the polycondensation of HMDA and 1,10-diaminodecane, respectively with 1,4-CHDA. In some embodiments, $n_1+n_2+n_4+n_5$ is at least 80 mol %, at least 90 mol %, at least 95 mol %, or at least 99 mol %.

In some embodiments, the polyamide (PA) has a number average molecular weight Mn of from 1,000 g/mol to 40,000 g/mol, from 2,000 g/mol to 35,000 g/mol, from 4,000 g/mol to 30,000 g/mol, or from 5,000 g/mol to 20,000 g/mol. The number average molecular weight Mn can be determined by gel permeation chromatography (GPC) using ASTM D5296 with polystyrene standards.

The polyamide (PA) is semi-crystalline. As used herein, a semi-crystalline polyamide comprises a heat of fusion ("$\Delta H_f$") of at least 5 joules per gram (J/g) at a heating rate of 20° C./min. Similarly, as used herein, an amorphous polyamide comprises a $\Delta H_f$ of less than 5 J/g at a heating rate of 20 C/min. $\Delta H_f$ can be measured according to ASTM D3418. In some embodiments, the $\Delta H_f$ is at least 20 J/g, at least 30 J/g or at least 40 J/g.

In some embodiments, the polyamide (PA) has a Tg of at least 100° C., at least 110° C., or at least 115° C. Additionally or alternatively, in some embodiment, the polyamide (PA) has a Tg of no more than 200° C., no more than 180° C., no more than 160° C., no more than 150° C., no more than 140° C., or no more than 135° C. In some embodiments, the polyamide (PA) has a Tg of from 100° C. to 150° C., from 110° C. to 140° C., or from 115° C. to 135° C. In some embodiments, the polyamide (PA) has a Tg of from 100° C. to 200° C., from 110° C. to 180° C., or from 115° C. to 160° C. In some embodiments, the polyamide (PA) has a Tm of at least 290° C., at least 300° C., or at least 310° C. Additionally or alternatively, in some embodiments, the polyamide (PA) has a Tm of no more than 360° C., no more than 350° C., or no more than 340° C. In some embodiments the polyamide (PA) has a Tm of from 290° C. to 360° C., from 300° C. to 350° C., or from 310° C. to 340° C. Tg and Tm can be measured according to ASTM D3418.

Polymer Composition (PC)

The polymer composition (PC) includes the polyamide (PA). The polyamide (PA) may be present in the polymer composition (PC) in a total amount of greater than 30 wt. %, greater than 35 wt. % by weight, greater than 40 wt. % or greater than 45 wt. %, based on the total weight of the polymer composition (PC). The polyamide (PA) may be present in the composition (PC) in a total amount of less than 99.95 wt. %, less than 99 wt. %, less than 95 wt. %, less than 90 wt. %, less than 80 wt. %, less than 70 wt. % or less than 60 wt. %, based on the total weight of the polymer composition (PC). The polyamide (PA) may, for example, be present in the polymer composition (PC) in an amount ranging between 30 wt. % and 70 wt. %, 35 wt. % and 60 wt. %, or between 40 wt. % and 55 wt. %, based on the total weight of the polymer composition (PC).

The polymer composition (PC) may also comprise one component selected from the group consisting of reinforcing agents, tougheners, plasticizers, colorants, pigments, antistatic agents, dyes, lubricants, thermal stabilizers, light stabilizers, flame retardants (including halogen free flame retardants), nucleating agents and antioxidants. Preferably, the polymer composition (PC) comprises a halogen free flame retardant, a reinforcing agent (e.g. glass fiber), or both.

A large selection of reinforcing agents, fibrous or particulate, may be added to the polymer composition (PC). A fibrous reinforcing agent is considered herein to be a material having length, width and thickness, wherein the average length is significantly larger than both the width and thickness. Generally, a fibrous reinforcing agent has an aspect ratio, defined as the average ratio between the length and the largest of the width and thickness of at least 5, at least 10, at least 20 or at least 50. In some embodiments, the reinforcing fibers (e.g. glass fibers or carbon fibers) have an average length of from 3 mm to 50 mm. In some such embodiments, the reinforcing fibers have an average length of from 3 mm to 10 mm, from 3 mm to 8 mm, from 3 mm to 6 mm, or from 3 mm to 5 mm. In alternative embodiments, the reinforcing fibers have an average length of from 10 mm to 50 mm, from 10 mm to 45 mm, from 10 mm to 35 mm, from 10 mm to 30 mm, from 10 mm to 25 mm or from 15 mm to 25 mm. The average length of the reinforcing fibers can be taken as the average length of the reinforcing fibers prior to incorporation into the polymer composition (PC) or can be taken as the average length of the reinforcing fiber after incorporation into the polymer composition (PC).

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43 48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may be present in the composition (PC) in a total amount of greater than 15 wt. %, greater than 20 wt. % by weight, greater than 25 wt. % or greater than 30 wt. %, based on the total weight of the polymer composition (PC). The reinforcing agents may be present in the polymer composition (PC) in a total amount of less than 65 wt. %, less than 60 wt. %, less than 55 wt. % or less than 50 wt. %, based on the total weight of the polymer composition (PC). The reinforcing filler may for example be present in the polymer composition (PC) in an amount ranging between 20 and 60 wt. %, for example between 30 and 50 wt. %, based on the total weight of the polymer composition (PC).

The polymer composition (PC) may also comprise a toughener. A toughener is generally a low Tg polymer, with a Tg for example below room temperature, below 0° C. or even below −25° C. Tougheners are typically elastomeric at room temperature. Tougheners can be functionalized polymer backbones. The polymer backbone of the toughener can be selected from elastomeric backbones comprising polyethylenes and copolymers thereof, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS);

core-shell elastomers of methacrylate-butadiene-styrene (MBS) type, or mixture of one or more of the above.

When the toughener is functionalized, the functionalization of the backbone can result from the copolymerization of monomers which include the functionalization or from the grafting of the polymer backbone with a further functionalizing component. Specific examples of functionalized tougheners include, but are not limited to, terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene copolymers grafted with maleic anhydride; SEBS copolymers grafted with maleic anhydride; styrene-acrylonitrile copolymers grafted with maleic anhydride; ABS copolymers grafted with maleic anhydride.

The toughener may be present in the polymer composition (PC) in a total amount of greater than 1 wt. %, greater than 2 wt. % or greater than 3 wt. %, based on the total weight of the polymer composition (PC). The toughener may be present in the polymer composition (PC) in a total amount of less than 30 wt. %, less than 20 wt. %, less than 15 wt. % or less than 10 wt. %, based on the total weight of the polymer composition (PC).

The polymer composition (PC) may also comprise other conventional additives commonly used in the art, including plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

The polymer composition (PC) may also comprise one or more other polymers, preferably polyamides different from the polyamide (PA). Mention can be made notably of semi-crystalline or amorphous polyamides, such as aliphatic polyamides, semi-aromatic polyamides, and more generally the polyamides obtained by polycondensation between an aromatic or aliphatic saturated diacid and an aliphatic saturated or aromatic primary diamine, a lactam, an amino-acid or a mixture of these different monomers.

Preparation of the Polymer Composition (PC)

Methods of making the polymer composition (PC) as above detailed are also provided, said methods comprising melt-blending the polyamide (PA) and the specific components, e.g. a filler, a toughener, a stabilizer, and of any other optional additives.

Any melt-blending method may be used for mixing polymeric ingredients and non-polymeric ingredients. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing may be used in the preparation of the polymer composition (PC).

Articles and Applications

The polyamide (PA) and polymer composition (PC) can be desirably incorporated into articles.

Such articles are useful in mobile electronics, LED packaging, oil and gas components, food contact components (including, but not limited to, food film and casing), electrical and electronic components (including, but not limited to, power unit components for computing, data-system and office equipment and surface mounted technology compatible connectors and contacts), medical device components, construction components (including, but not limited to, pipes, connectors, manifolds and valves, for cooling and heating systems; boiler and meter components; gas systems pipes and fittings; and electrical protection devices for mini-circuit breakers, contactors, switches and sockets), industrial components, plumbing components (including, but not limited to, pipes, valves, fittings, manifolds, shower taps and shower valves), automotive components, and aerospace components (including, but not limited to, interior cabin components).

The article can be, for example, a mobile electronic device component. As used herein, a "mobile electronic device" refers to an electronic device that is conveniently transported and used in various locations. A mobile electronic device can include, but is not limited to, a mobile phone, a personal digital assistant ("PDA"), a laptop computer, a tablet computer, a wearable computing device (e.g., a smart watch, smart glasses and the like), a camera, a portable audio player, a portable radio, a global position system receiver, and a portable game console.

The mobile electronic device component may include, for example, a radio antenna and the polymer composition (PC). In this case, the radio antenna can be a WiFi antenna or an RFID antenna. The mobile electronic device component may also be an antenna housing.

In some embodiments, the mobile electronic device component is an antenna housing. In some such embodiments, at least a portion of the radio antenna is disposed on the polymer composition (PC). Additionally or alternatively, at least a portion of the radio antenna can be displaced from the polymer composition (PC). In some embodiments, the device component can be a mounting component with mounting holes or other fastening feature, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device.

Examples of electric and electronics devices are connectors, contactors and switches.

The polyamide (PA) or polymer composition (PC) and articles prepared therefrom may also be used as a gas barrier material for packaging applications, in mono or multilayer articles.

Examples of oil and gas components include, but are not limited to, compressor rings, poppets, back-up seal rings, electrical connectors, labyrinth seals, motor end plates, bearings, bushings, suck rod guides and down hole tubing.

Examples of automotive components include, but are not limited to, components in thermal management systems (including, but not limited to, thermostat housings, water inlet/outlet valves, water pumps, water pump impellers, and heater cores and end caps), air management system components (including, but not limited to, turbocharger actuators, turbocharger by-pass valves, turbocharger hoses, EGR valves, CAC housings, exhaust gas recirculation systems, electronic controlled throttle valves, and hot air ducts), transmission components and launch device components (including, but not limited to, dual clutch transmissions, automated manual transmissions, continuously variable transmissions, automatic transmissions, torque convertors, dual mass flywheels, power takeoffs, clutch cylinders, seal rings, thrust washers, thrust bearings, needle bearings, and check balls), automotive electronic components, automotive lighting components (including, but not limited to, motor end caps, sensors, ECU housings, bobbins and solenoids, connectors, circuit protection/relays, actuator housings, Li- Ion battery systems, and fuse boxes), traction motor and power electronic components (including, but not limited to, battery packs), fuel and selective catalytic reduction ("SCR") systems (including, but not limited to, SCR module housings and connectors, fuel flanges, rollover valves, quick connects, filter housings, fuel rails, fuel delivery modules, fuel hoses, fuel pumps, fuel injector o-rings, and fuel hoses), fluid system components (e.g. fuel system components including, but not limited to inlet and outlet valves and fluid pump components), interior components (e.g. dashboard, display, and seating components), and structural and lightweight components (e.g. gears and bearings, sunroofs, brackets and mounts, electrical battery housings, thermal management components, braking system elements, and pump and EGR systems).

The article can be molded from the polyamide (PA) or polymer composition (PC) by any process adapted to thermoplastics, e.g. extrusion, injection molding, blow molding, rotomolding or compression molding.

The article can be printed from the polyamide (PA) or polymer composition (PC) by extruding the material, if in the form of a filament, and fusing layers of filaments together, e.g., as by Fused Filament Fabrication or Fused Deposition Modelling. Alternatively, the polyamide (PA) or polymer composition (PC) can be in the form of a powder, for example a substantially spherical powder, and used in a laser sintering process, such as Selective Laser Sintering.

In some embodiments, the polyamide (PA) or polymer composition (PC) can be desirably incorporated into three-dimensional printing applications. One application is directed to a method for manufacturing a three-dimensional ("3D") object with an additive manufacturing system, comprising providing a part material comprising the polyamide (PA) or polymer composition (PC), and printing layers of the three-dimensional object from the part material.

The polyamide (PA) or polymer composition (PC) can be incorporated into a composite. A composite includes continuous reinforcing fibers embedded in a thermoplastic matrix. In some embodiments, the continuous reinforcing fiber is selected from glass fiber, carbon fibers, aluminum fiber, titanium fiber, magnesium fiber, boron carbide fibers, rock wool fiber, steel fiber, aramid fiber, natural fiber (e.g. cotton, linen and wood) and any combination of one or more, thereof. Preferably, the continuous reinforcing fiber is glass fiber or carbon fiber. As used herein, continuous reinforcing fibers are reinforcing fibers that have an average length in the longest dimension of at least 5 millimeters ("mm"), at least 10 mm, at least 25 mm or at least 50 mm. The thermoplastic matrix includes the polyamide (PA) or polymer composition (PC). The composite can be a unidirectional composite (e.g. a tape) or a multidirectional composite (e.g. a woven fabric, a mat, or a layered fabric).

Use of the Polyamides (PA), Polymer Compositions (PC) and Articles

In some embodiments, the polyamides (PA), polymer compositions (PC) or articles can be used for manufacturing an article, such as a mobile electronic device component, as described above.

The polyamides (PA) or polymer compositions (PC) can also be used for 3D printing an object.

EXAMPLES

These examples demonstrate the thermal and moisture absorption performance the polyamides (PA). As used in the Examples, "E" denotes an example embodiment of the present invention and "CE" denotes a counter example.

Raw Materials
 HMDA: obtained from Ascend Performance Materials (70%)
 1,10-diaminodecane ("DMDA"): obtained from Solvay (Novecare)
 1,3-BAC: obtained from Mitsubishi Gas Chemical Company
 Terephthalic Acid ("TA"): obtained from Flint Hills Resources
 Isophthalic Acid ("IA"): obtained from Flint Hills Resources
 Adipic Acid ("AA"): obtained from Invista
 1,4-CHDA: obtained from Eastman Chemical Company
 4-AMCC: obtained from Sigma-Aldrich
 PA 6,T/6,6 65/35: obtained from Solvay Specialty Polymers USA, L.L.C.
 PA10,T/10,I: Obtained from Kingfa (Vicnyl® 6100)
 PA9,T: Obtained from Kuraray (Genestar™ 61210)
 Impact Modifier: Obtained from Kraton Corporation (Kraton™ FG1901 GT; linear triblock copolymer based on styrene and ethylene/butylene with a polystyrene content of 30%)
 Glass Fiber: Chopped E-glass Fiber (NEG HP 3610 from Nippon Electric Glass Co.)
 Additive Package: Consisted of mold release, antioxidant and talc.

Example 1

Synthesis of Polyamides and Polymer Compositions

This example demonstrates the synthesis of the polyamides.

All of the copolyamides shown in Table 1 were prepared according to the following similar process using a 1-gallon autoclave reactor equipped with a distillate line fitted with a pressure control valve. As an example, in the preparation of copolyamide E1, the reactor was charged with 283 g of DI water, 173 g of hexamethylenediamine (70%), 116 g of 1,10-diaminodecane, 242 g of terephthalic acid, 22 g of 1,-4-cyclohexanedicarboxylic acid, 1.9 g of acetic acid and 0.16 g of phosphorus acid. The reactor was sealed, purged with nitrogen and heated to 260° C. The steam generated was slowly released to keep the internal pressure at 120 psig. The temperature was increased to 320° C. The reaction mixture was kept at 320° C. and the reactor pressure was reduced to atmospheric. After holding for an additional 60min, the polymer was discharged from the reactor.

Larger quantities of copolyamides were prepared analogously to following method for the preparation of E1: A stirred batch vessel was charged with 33.7 kg deionized water; a diamine component consisting of 21.58 kg of 70% hexamethylenediamine, 14.47 kg of 1,10-diaminodecane; and a dicarboxylic acid component consisting of 30.11 kg of terephthalic acid and 2.71 kg of 1,4-cyclohexanedicarboxylic acid. The reactor was also charged with 17.03 g phosphorus acid and 360.30 g of glacial acetic acid. A salt solution was obtained by heating the above described mixture at 150° C. The contents were pumped continuously to a reactor zone maintained at about 180 psig and 220° C., then to a high pressure zone maintained at 300° C. and then through a tubular reactor at 100 psig heated to 350° C. The melt was fed into a twin-screw extruder equipped with a forward vacuum vent. The finished polymer was extruded through a strand die into a water bath and chopped into pellets.

Sample parameters are shown in Table 1. For clarity, in the "Polyamide" column of Table 1, numeric prefixes are suppressed. For example, 1,3-BAC is referred to as BAC in the "Polyamide" column in Table 1.

TABLE 1

| | Reaction Mixture (RM) | | | | | | | |
|---|---|---|---|---|---|---|---|---|
| | Diamine Component (A) (mol %) | | | Dicarboxylic Acid Component (B) (mol %) | | | Amino Acid Component | Polyamide Recurring Units in |
| Example | HMDA | DMDA | 1,3-BAC | TA | IA | AA | 1,4-CHDA | (C) (mol %) 4-AMCC | the Polyamide (PA) |
| CE1 | 65 | 35 | | 80 | | | 20 | | 6, T/10, T/6, CHDA/10, CHDA |
| E1 | 65 | 35 | | 92 | | | 8 | | 6, T/10, T/6, CHDA/10, CHDA |
| CE2 | 65 | 35 | | 100 | | | | | 6, T/10, T |
| E3 | 65 | 35 | | 100 | | | | 5 | 6, T/10, T/AMCC |
| CE3 | 65 | 35 | | 92 | 8 | | | | 6, T/10, T/6, I/10, I |
| E4 | 60 | 35 | 5 | 100 | | | | | 6, T/10, T/BAC, T |
| CE4 | 100 | | | 70 | 30 | | | | 6, T/6, I |
| CE5 | 100 | | | 55 | 45 | | | | 6, T/6, 6 |
| CE6 | 100 | | | 65 | 25 | 10 | | | 6, T/6, I/6, 6 |
| CE7 | 65 | 35 | | 95 | 5 | | | | 6, T/10, T/6, I/10, I |
| E5 | 57 | 35 | 8 | 100 | | | | | 6, T/10, T/BAC, T |

Additionally, polymer compositions were formed from the polymers in Table 1, as well as other polyamides, to demonstrate mechanical performance. Sample parameters are shown in Table 1A (all values are in wt. %). The polyamide E5 used in the compositions has an Inherent Viscosity (IV) of 1.15 dL/g as measured according to ASTM D5225.

TABLE 1A

| Example | E6 | E7 | CE8 | CE9 | CE10 | CE11 |
|---|---|---|---|---|---|---|
| PA 6, T/10, T/BAC, T (E5) | 68.50 | 65.40 | | | | |
| PA 6, T/6, 6 65/35 | | | 68.50 | 65.40 | | |
| PA 10, T/10, I | | | | | 68.50 | |
| PA 9, T | | | | | | 68.50 |
| Impact Modifier | | 3.10 | | 3.10 | | |
| Additive Package | 1.5 | 1.5 | 1.5 | 1.5 | 1.5 | 1.5 |
| Glass Fiber | 30 | 30 | 30 | 30 | 30 | 30 |

Example 2

Thermal Performance

To demonstrate thermal performance, Tm, Tg, Tc, enthalpy of melting ("Hm") and enthalpy of crystallization ("Hc") were measured. Tm and Tg were measured as described above. Tc, Hm and Hc were measured according to ASTM D3418. Water absorption for the neat resins (see Table 2) were measured as follows: Discs 2 inches in diameter and 1/8 inch thick were molded. The disc samples were placed in boiling water and their weights were monitored regularly until they became constant. The percent water absorption was calculated as ((weight final−weight initial)/(weight initial))×100. The water absorption reported in Table 2A was measured according to ASTM D570.

TABLE 2

| Example | Tg (° C.) | Tm (° C.) | Hm (J/g) | Tc (° C.) | Hc (J/g) | Water Absorption (%) |
|---|---|---|---|---|---|---|
| CE1 | 123 | 312 | 53 | 273 | 45 | 4.0 |
| E1 | 128 | 321 | 50 | 276 | 48 | 3.9 |
| CE2 | 123 | 322 | 68 | 289 | 55 | 3.7 |
| E3 | 130 | 321 | 52 | 272 | 55 | 4.0 |
| CE3 | 119 | 318 | 55 | 275 | 49 | 4.1 |
| E4 | 130 | 320 | 60 | 268 | 54 | 4.9 |
| CE4 | 137 | 320 | 50 | 267 | 51 | 6.0 |
| CE5 | 105 | 325 | 68 | 287 | 54 | 7.0 |
| CE6 | 125 | 309 | 53 | 253 | 43 | 6.2 |
| CE7 | 123 | 319 | 78 | 289 | 62 | 3.9 |

TABLE 2A

| Example | Tg (° C.) | Tm (° C.) | Water Absorption (%) |
|---|---|---|---|
| E5 | 132 | 315 | 0.24 |
| E6 | 132 | 315 | 0.23 |
| CE8 | 100 | 325 | 0.32 |
| CE9 | 100 | 325 | 0.33 |
| CE10 | 110 | 292 | 0.15 |
| CE11 | 110 | 307 | 0.14 |

Referring to Table 2, comparison of CE1, CE2 and E1 demonstrates that, surprisingly, introducing a relatively small amount of 1,4-CHDA (8 mol %) into PA 6T/10T significantly increases the Tg (5° C.), while maintaining a high Tm and Tc. On the other hand, introducing larger amounts of 1,4-CHDA (20 mol %, CE1) decreases both the Tg and Tm, relative to PA 6T/10T. Furthermore, comparison of CE2 and E3 shows that a small amount of 4-AMCC significantly increases the Tg (7° C.) of a PA 6T/10T copolymer, while maintaining a high Tm and Tc. Comparison of CE2 and E4 shows that a relatively small amount of 1,3-BAC (5 mol %) significantly increases the Tg (7° C.) of a PA 6T/10T copolymer while maintaining a high Tg and Tc.

Unlike examples E1, E3, E4 that contain a small amount of cycloaliphatic monomer containing a cyclohexyl group, the addition of a small amount of an aromatic containing diacid such as isophthalic acid (CE3 and CE7) decreases Tg and Tm.

Example 3

Mechanical Performance

To demonstrate mechanical performance, tensile stress, tensile strain, weld tensile stress and weld tensile strain were measured according to ISO 527. The mechanical properties were measured on sample injection molded with one gate ("normal") and two gates ("weld") to assess the effect of the weld-line. Results are displayed in Table 3.

TABLE 3

| Example | E6 | E7 | CE8 | CE9 | CE10 | CE11 |
|---|---|---|---|---|---|---|
| Tensile Stress-"normal" (MPa) | 214 | 202 | 197 | 208 | 194 | 181 |
| Tensile Strain-"normal" (%) | 2.90 | 3.00 | 2.00 | 2.60 | 2.50 | 2.20 |
| Weld Tensile Stress-"weld" (MPa) | 87.1 | 111.0 | 58.4 | 80.3 | 60.6 | 50.7 |
| Weld Tensile Strain-"weld" (%) | 1.20 | 1.60 | 0.67 | 1.00 | 0.87 | 0.70 |

Referring to Table 3, E6 and E7 generally had improved mechanical properties, relative to examples CE8 to CE11. While the resin E5 used in composition E6 is composed of a lower content of flexible long chain diamine than the resins of composition CE10 and CE11, composition E6 has a higher strength and exhibits surprisingly a higher elongation and weld line strength compared to compositions CE10 and CE11. These improved mechanical properties are kept when an impact modifier is introduced in composition E7.

The embodiments above are intended to be illustrative and not limiting. Additional embodiments are within the inventive concepts. In addition, although the present invention is described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

The invention claimed is:

1. A polyamide (PA) formed from the polycondensation of a reaction mixture (RM) comprising:
   a diamine component (A) comprising:
   55 mol % to 75 mol % of a $C_4$ to $C_8$ aliphatic diamine,
   25 mol % to 45 mol % of a $C_9$ to $C_{12}$ aliphatic diamine, and
   0.5 mol % to 10 mol % of a cycloaliphatic diamine containing a cyclohexyl group, which is 1,3-bis(aminomethyl)cyclohexane (1,3-BAC) or 1,4bis(aminomethyl)cyclohexane (1,4-BAC),
   wherein mol % is relative to the total number of moles of diamines in the diamine component (A);
   a dicarboxylic acid component (B) comprising:
   90 mol % to 100 mol % of terephthalic acid, and
   0 mol % to 10 mol % of a $C_6$ to $C_{18}$ aliphatic dicarboxylic acid or an $C_8$ to $C_{18}$ aromatic dicarboxylic acid distinct from terephthalic acid,
   wherein mol % is relative to the total number of moles of dicarboxylic acids in the dicarboxylic acid component (B), and
   wherein the reaction mixture (RM) is free of a cycloaliphatic dicarboxylic acid containing a cyclohexyl group and free of a $C_8$ to $C_{10}$ cycloaliphatic amino acid containing a cyclohexyl group.

2. The polyamide (PA) of claim 1, wherein the $C_4$ to $C_8$ aliphatic diamine is selected from the group consisting of 1,4-diaminobutane, 1,5-diaminopentane, 2-methyl-1,5-diaminopentane, HMDA, 3-methylhexamethylenediamine, 2,5-dimethylhexamethylenediamine, 1,7-diaminoheptane and 1,8-diaminooctane.

3. The polyamide (PA) of claim 1, wherein the $C_9$ to $C_{12}$ aliphatic diamine is selected from the group consisting of 2,2,4-trimethyl-hexamethylenediamine, 2,4,4-trimethyl-hexamethylenediamine, 2-ethyl-1,7-diaminoheptane, 2-methyl-1,8-diaminooctane, 2,2,7,7-tetramethyloctamethylenediamine, 1,9-diaminononane, 2-methyl-1,8-diaminooctane, 5-methyl-1,9-diaminononane, 1,10-diaminodecane, 1,11-diaminoundecane, and 1,12-diaminododecane.

4. The polyamide (PA) of claim 1, wherein the $C_6$ to $C_{18}$ aliphatic dicarboxylic acid is selected from the group consisting of 2,2-dimethyl-glutaric acid, adipic acid, 2,4,4-trimethyl-adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, and octadecanedioic acid.

5. The polyamide (PA) of claim 1, wherein the $C_8$ to $C_{18}$ aromatic dicarboxylic acid distinct from terephthalic acid is selected from the group consisting of isophthalic acid, naphthalenedicarboxylic acid, 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl)propane, 2,2-bis(4-carboxyphenyl)hexafluoropropane, 2,2-bis(4-carboxyphenyl)ketone, 4,4-bis(4-carboxyphenyl)sulfone, 2,2-bis(3-carboxyphenyl)propane, 2,2-bis(3-carboxyphenyl)hexafluoropropane, 2,2-bis(3-carboxyphenyl)ketone, and bis(3-carboxyphenoxy)benzene.

6. The polyamide (PA) of claim 1, wherein the $C_8$ to $C_{10}$ cycloaliphatic amino acid containing a cyclohexyl group is 1,4aminomethylcyclohexanecarboxylic acid ("4-AMCC").

7. The polyamide (PA) of claim 1, wherein the reaction mixture (RM) is free of the $C_6$ to $C_{18}$ aliphatic dicarboxylic acid and/or the $C_8$ to $C_{18}$ aromatic dicarboxylic acid distinct from terephthalic acid.

8. A polymer composition (PC), comprising: the polyamide (PA) formed from the polycondensation of the reaction mixture (RM) defined in claim 1
at least one component selected from the group consisting of reinforcing agents, tougheners, plasticizers, colorants, pigments, antistatic agents, dyes, lubricants, thermal stabilizers, light stabilizers, flame retardants, halogen free flame retardants, nucleating agents and antioxidants.

9. The polymer composition (PC) of claim 8, comprising from 10 wt. % to 60 wt. % of glass fibers, based on total weight of the polymer composition (PC).

10. The polymer composition (PC) of claim 8, comprising from 30 wt. % to 99.95 wt. % of the polyamide (PA).

11. The polyamide of claim 1, wherein the polyamide comprises a ΔHf measured according to ASTM D3418 of at least 30 J/g.

12. The polyamide of claim 1, wherein the polyamide comprises a ΔHf measured according to ASTM D3418 of at least 40 J/g.

13. The polyamide of claim 1, wherein the polyamide comprises a $T_g$ measured according to ASTM D3418 of at least 115° C.

14. The polyamide of claim 1, wherein the polyamide comprises a $T_m$ measured according to ASTM D3418 of at least 310° C.

15. The polyamide of claim 1, wherein the concentration of the cycloaliphatic diamine containing a cyclohexyl group is from 3 mol % to 10 mol %.

16. The polyamide of claim 1, wherein the concentration of the $C_9$ to $C_{12}$ aliphatic diamine is from 30 mol % to 38 mol %.

17. A polyamide (PA) formed from the polycondensation of a reaction mixture (RM) comprising:
a diamine component (A) comprising:
55 mol % to 75 mol % of a $C_4$ to $C_8$ aliphatic diamine, and
25 mol % to 45 mol % of a $C_9$ to $C_{12}$ aliphatic diamine;
wherein mol % is relative to the total number of moles of diamines in the diamine component (A);
a dicarboxylic acid component (B) comprising:
90 mol % to 100 mol % of terephthalic acid,
0 mol % to 10 mol % of a $C_6$ to $C_{18}$ aliphatic dicarboxylic acid, and
0.5 mol % to 10 mol % of a cycloaliphatic dicarboxylic acid containing a cyclohexyl group which is 1,3-CHDA or 1,4-CHDA,
wherein mol % is relative to the total number of moles of dicarboxylic acids in the dicarboxylic acid component (B); and
wherein the reaction mixture (RM) is free of:
a cycloaliphatic diamine containing a cyclohexyl group and free of a $C_8$ to $C_{10}$ cycloaliphatic amino acid containing a cyclohexyl group, and
an $C_8$ to $C_{18}$ aromatic dicarboxylic acid distinct from terephthalic acid.

18. The polyamide of claim 14, wherein the polyamide comprises a ΔHf measured according to ASTM D3418 of at least 30 J/g.

19. The polyamide of claim 14, wherein the polyamide comprises a ΔHf measured according to ASTM D3418 of at least 40 J/g.

20. The polyamide of claim 14, wherein the polyamide comprises a $T_g$ measured according to ASTM D3418 of at least 115° C.

21. The polyamide of claim 14, wherein the polyamide comprises a $T_m$ measured according to ASTM D3418 of at least 310° C.

22. The polyamide of claim 14, wherein the concentration of the cycloaliphatic dicarboxylic acid containing a cyclohexyl group is from 3 mol % to 9 mol %.

* * * * *